US011008209B2

(12) United States Patent
Mathissen et al.

(10) Patent No.: US 11,008,209 B2
(45) Date of Patent: May 18, 2021

(54) ANITFREEZE CARTRIDGE AND FROST-PROTECTION SYSTEM OF A MOTOR VEHICLE

(71) Applicant: FORD GLOBAL TECHNOLOGIES, LLC, Dearborn, MI (US)

(72) Inventors: Marcel Mathissen, Würselen (DE); Julius Maximilian Engelke, Aachen (DE); Thomas Baranowski, Würselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 16/269,375

(22) Filed: Feb. 6, 2019

(65) Prior Publication Data
US 2019/0225481 A1 Jul. 25, 2019

(30) Foreign Application Priority Data

Jan. 22, 2018 (DE) .......................... 102018200942.2

(51) Int. Cl.
B67D 7/02 (2010.01)
B65D 51/00 (2006.01)
B60S 1/48 (2006.01)

(52) U.S. Cl.
CPC .............. B67D 7/0288 (2013.01); B60S 1/48 (2013.01); B65D 51/002 (2013.01)

(58) Field of Classification Search
CPC ........ B67D 7/0288; B60S 1/48; B60S 1/0874; B60S 1/0877; B60S 1/0881; B60S 1/0885;

(Continued)

(56) References Cited

U.S. PATENT DOCUMENTS 3,010,473 A * 11/1961 McCurnin ................. B60S 1/50
  137/353
3,461,475 A *  8/1969 Mathison .................. B60S 1/50
  15/250.01

(Continued)

FOREIGN PATENT DOCUMENTS

DE        10318752 A1   11/2004
DE    102009012010 A1    9/2010

OTHER PUBLICATIONS

English Machine Translation of DE102009012010A1 dated Sep. 9, 2010.
English Machine Translation of DE10318752A1 dated Nov. 11, 2004.

Primary Examiner — Timothy P. Kelly
Assistant Examiner — Christopher M Afful
(74) Attorney, Agent, or Firm — David Coppiellie; King & Schickli, PLLC

(57) ABSTRACT

An antifreeze cartridge includes a container containing an antifreeze agent, and a sealing film on the container. A connecting structure is configured and intended to be connected by force fit or form fit to a complementary receiver of an antifreeze inlet of a motor vehicle. The container has a handling portion which is configured and intended to allow the manual connection of the connecting structure to the complementary receiver of the antifreeze inlet. The sealing film is configured and intended to be perforated by a hollow perforation element of the antifreeze inlet so that the antifreeze agent contained in the container can be supplied to a frost-protection system of the motor vehicle through the hollow perforation element. A motor vehicle has an antifreeze inlet wherein the antifreeze inlet is accessible from the outside of an engine bay of the motor vehicle without opening a hood of the motor vehicle.

7 Claims, 5 Drawing Sheets

(58) Field of Classification Search
CPC .... B60S 1/0888; B60S 1/3411; B65D 51/002; F01M 11/04; F01M 2011/0483; B60K 2370/785

See application file for complete search history.

(56) References Cited

U.S. PATENT DOCUMENTS

| | | | | |
|---|---|---|---|---|
| 4,905,904 | A | * | 3/1990 | Ohara .................... B60S 1/482 |
| | | | | 215/309 |
| 5,141,160 | A | | 8/1992 | Waters |
| 5,853,025 | A | * | 12/1998 | Daneshvar ............. B60S 1/481 |
| | | | | 137/565.34 |
| 5,946,763 | A | * | 9/1999 | Egner-Walter ....... B60H 3/0658 |
| | | | | 15/250.02 |
| 6,732,953 | B2 | | 5/2004 | Krause et al. |
| 7,553,801 | B2 | | 6/2009 | Alexander et al. |
| 2005/0184096 | A1 | | 8/2005 | Levia |
| 2008/0210331 | A1 | * | 9/2008 | Compere ............... B60K 15/04 |
| | | | | 141/2 |

* cited by examiner

ANITFREEZE CARTRIDGE AND FROST-PROTECTION SYSTEM OF A MOTOR VEHICLE

TECHNICAL FIELD

The document concerns an antifreeze cartridge and a frost-protection system consisting of the antifreeze cartridge and an antifreeze supply device of a motor vehicle. This document furthermore concerns a motor vehicle with an antifreeze inlet.

BACKGROUND

Motor vehicles usually have a screenwash tank containing a washing agent for the screenwash system. The washing agent is composed of an antifreeze agent and a water-based dilutant. The dilutant may for example be distilled water. The antifreeze agent must be added to the dilutant in order to lower the freezing point of the dilutant to a necessary temperature. Depending on the concentration of the antifreeze agent in the dilutant, the freezing point of the dilutant is lowered for example to −10° C., −30° C. or −50° C. The antifreeze agent may also be called an antifreeze concentrate which must be mixed with the dilutant for correct use. The antifreeze agent is usually sold in plastic tanks or bottles, and the user adds it through a corresponding filler neck to the screenwash tank which is usually present in the engine bay of the motor vehicle. To this end, the user must open and secure the hood, then remove a cover of the screenwash tank in order to carry out the filling. This process is not user-friendly, in particular for users with physical restrictions. In addition, the engine bay is often dirty so users can also soil their clothing or body. Filling is required many times during a life of a motor vehicle, at least every time the screenwash tank is empty.

DE 103 18 752 A1 describes a sensor for measuring a concentration of an antifreeze agent in a water mixture with a measuring element which is immersed in the water mixture. The water mixture is situated in a tank which is connected to an antifreeze agent tank via a connecting line and a pump device. Depending on the concentration measured, a corresponding quantity of antifreeze agent is added to the water mixture.

DE 10 2009 012 010 A1 describes a frost-protection system with a washing water container, a sensor unit on the washing water container, a multichamber concentrate storage container for receiving different liquid concentrates, with at least one antifreeze cartridge, a washing concentrate chamber and at least one further washing concentrate chamber. The frost-protection system further includes a mixing device, a washing water pump at the outlet from the washing water container, and a windscreen which can be sprayed with washing water and the concentrate mixed therein via at least one washer nozzle. When the temperature of the washing water in the washing water container is close to or below the freezing point, an antifreeze agent is introduced to the washing water container from the antifreeze agent chamber of the multichamber concentrate storage container via a connecting line. Independently of this, when the windscreen is soiled, at least one washing concentrate is conducted to the mixing device from at least one of the washing concentrate storage containers of the multichamber concentrate storage container via at least one of the line connections.

Similar techniques are known from U.S. Pat. Nos. 5,141,160 A and 6,732,953 A. U.S. Pat. No. 5,141,160 A describes a device for defrosting a windscreen of a motor vehicle with a windscreen washing device which has a pump for supplying washing fluid to the washing device and a pressurized container from which methanol is discharged through a valve for mixing with the washing fluid. U.S. Pat. No. 6,732,953 A describes a screen washing system for a motor vehicle with a washing liquid reservoir containing a washing liquid, and a separator for receiving the washing liquid from the reservoir and for adjusting a hydrocarbon additive concentration of the washing liquid depending on a temperature.

US 2005/0184096 A1 discloses a flexible bag which may contain coolant with antifreeze, but this is not mixed further.

Finally, it is generally known that the antifreeze inlet is situated in the engine bay of a motor vehicle, more precisely below the hood.

SUMMARY

In view of the above, the antifreeze cartridge, the frost-protection system and the motor vehicle leave room for improvements.

It is an objective of this document to provide an antifreeze cartridge, a frost-protection system and a motor vehicle with which user-friendliness may be improved.

This object is achieved by an antifreeze cartridge, a frost-protection system, and a motor vehicle with the features set forth in the following claims.

It is pointed out that the features and measures listed individually in the description below may be combined with each other in any technically sensible fashion and disclose further embodiments of the antifreeze cartridge, frost-protection system and motor vehicle. The description characterizes and specifies the antifreeze cartridge, frost-protection system and motor vehicle further, in particular in connection with the figures.

The antifreeze cartridge has a container containing an antifreeze agent which is intended for a screenwash system of a motor vehicle, a sealing film on the container and a connecting structure which is configured and intended to be connected by force fit or form fit to a complementary receiver of an antifreeze inlet of the motor vehicle. The container has a handling portion which is configured and intended to allow the manual connection of the connecting structure to the complementary receiver of the antifreeze inlet. The sealing film is configured and intended to be perforated by a hollow perforation element of the antifreeze inlet so that the antifreeze agent contained in the container can be supplied to a frost-protection system of the motor vehicle through the hollow perforation element. Advantageously, user-friendliness is greatly improved since filling can be achieved with "one simple action", in that the antifreeze cartridge is directly attached to an antifreeze inlet of a motor vehicle, simply and permanently, without further apparatus being required.

Preferably, the connecting structure is configured such that, on connection to the complementary receiver of the antifreeze inlet, the hollow perforation element automatically perforates the sealing film. Thus connection of the antifreeze cartridge can be achieved easily. Preferably, the connecting structure is a thread, a bayonet connection or a snap closure which is further preferably watertight.

Preferably, the connecting structure has a blocking device which is configured to prevent release of the connecting structure from the complementary receiver of the antifreeze inlet if a predefined minimum quantity of the antifreeze agent is present in the container. This avoids the user accidentally releasing a filled antifreeze cartridge and the antifreeze agent escaping undesirably.

The frost-protection system consists of an antifreeze cartridge and an antifreeze supply device of a motor vehicle having the antifreeze inlet. The antifreeze supply device has a screenwash tank which is connected via a transport line to the hollow perforation element in order to supply the antifreeze agent from the antifreeze inlet to the screenwash tank, and the antifreeze supply device has a pump and a control device which are configured to supply the antifreeze agent from the container to the screenwash tank in a metered fashion.

Preferably, the antifreeze supply device has an overflow line through which the antifreeze agent can be discharged from the container to the environment. In this way, the antifreeze agent can be discharged manually and rapidly, for example if the user wishes to release the antifreeze cartridge which still contains a residual quantity of antifreeze agent.

Preferably, the antifreeze cartridge is arranged in a glovebox of the motor vehicle. This means that the antifreeze cartridge is easily accessible. To replace the antifreeze cartridge, there is no need to open the hood of the motor vehicle.

The object is also achieved by a motor vehicle with an antifreeze inlet in which the antifreeze inlet is accessible from the outside of an engine bay of the motor vehicle without opening the hood of the motor vehicle. In this case too, the hood of the motor vehicle need not be opened when the antifreeze agent is topped up, thus substantially improving user-friendliness.

Preferably, the antifreeze inlet is concealed below a brand logo of the motor vehicle or under a cover of a fuel filler neck of the motor vehicle. This achieves an economical solution since no separate cover for the antifreeze inlet need be provided.

Preferably, the motor vehicle comprises the frost-protection system described above so that user-friendliness can be improved further.

BRIEF DESCRIPTION OF THE DRAWING FIGURES

Advantageous embodiments of the antifreeze cartridge, the frost-protection system and the motor vehicle are disclosed in the following claims and in the following description of the figures. The drawings show:

FIG. 1A is a frost-protection system, according to an exemplary embodiment, consisting of an antifreeze cartridge and an antifreeze supply device of a motor vehicle, FIG. 1B is a schematic illustration of the frost-protection system of FIG. 1A showing (a) the perforation element of the antifreeze inlet puncturing the sealing film on the outlet opening of the container, as well as (b) the blocking device, (c) the control device and (d) the pump of the antifreeze supply device.

DETAILED DESCRIPTION

In the various figures, the same parts always carry the same reference signs, so these are usually only described once.

Figure 1A:
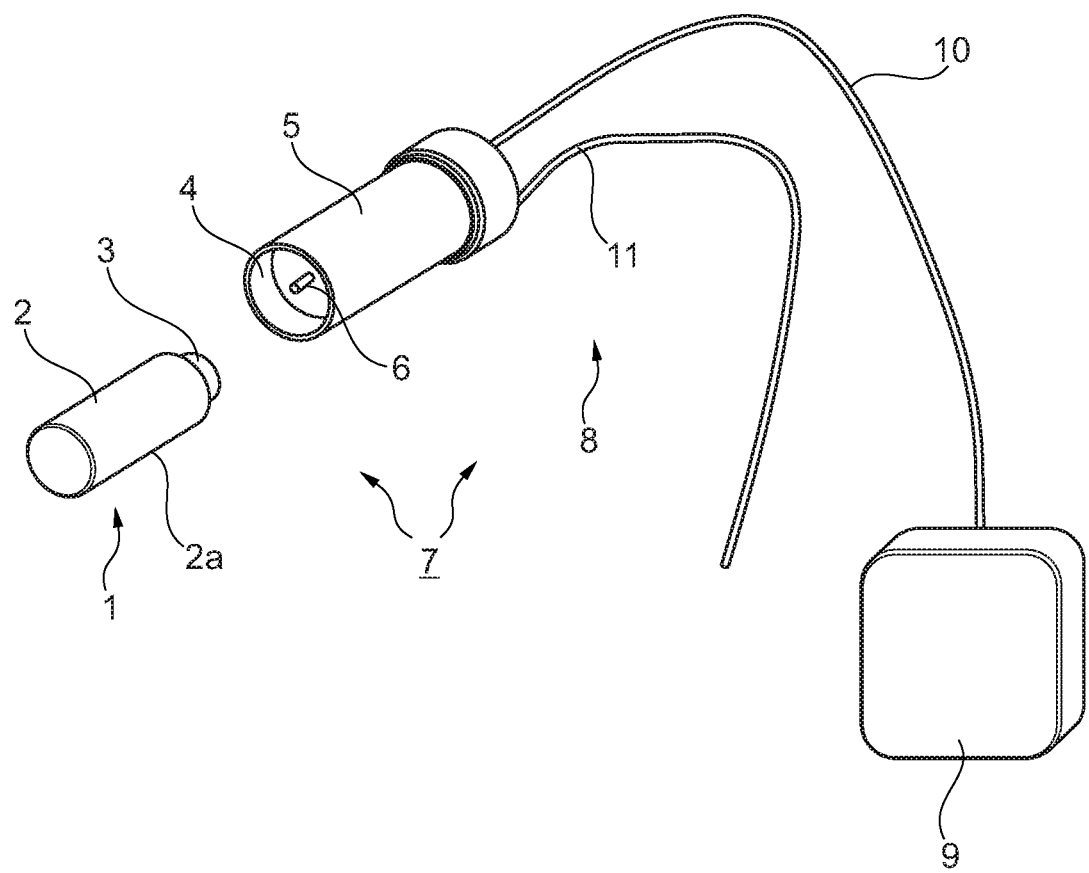
Figure 1B:
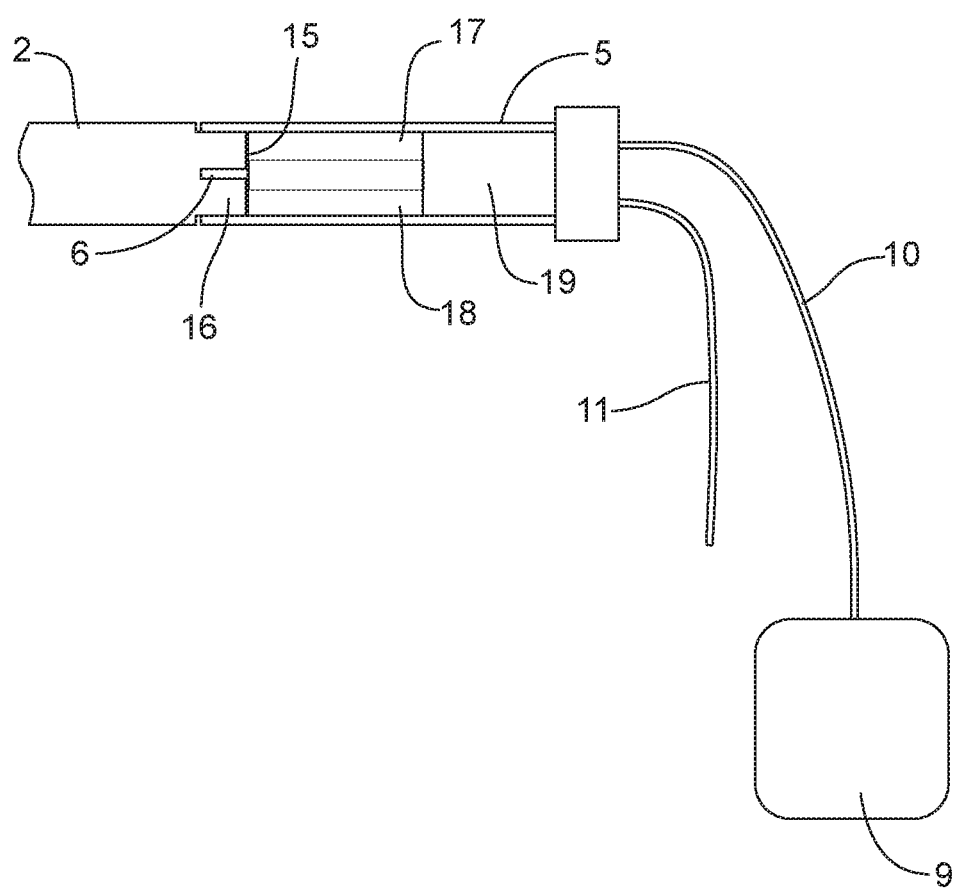

FIGS. 1A and 1B show a frost-protection system 7 consisting of an antifreeze cartridge 1 and an antifreeze supply device 8 of a motor vehicle. The frost-protection system 7 is known as an Antifreeze Capsule Refill System (ACRS). The antifreeze cartridge 1 has a container 2 containing an antifreeze agent intended for a screenwash system of a motor vehicle, a sealing film 15 on the container 2, and a connecting structure 3 which is configured to be connected by force fit or form fit to a complementary receiver 4 of an antifreeze inlet 5 of the motor vehicle. The container 2 is a substantially hollow cylindrical body with a rigid housing which also serves as a handling portion 2a in order to be able to connect manually the connecting structure 3 to the complementary receiver 4 of the antifreeze inlet 5. The container 2 may be designed in various formats, colors and temperature resistance levels. It is also possible to integrate certain design elements such as for example LEDs for illumination. An LED may also be integrated which indicates the fill level in the container 2.

The sealing film 15 seals an outlet opening 16 of the container 2. The sealing film 15 is configured to be perforated by a hollow perforation element 6 of the antifreeze inlet 5 so that the antifreeze agent contained in the container 2 can be supplied to the frost-protection system 7 of the motor vehicle through the hollow perforation element 6. The hollow perforation element 6 may for example be a hollow needle or cannula.

The connecting structure 3 is configured such that on connection to the complementary receiver 4 of the antifreeze inlet 5, the hollow perforation element 6 automatically perforates the sealing film. To this end, the connecting structure 3 is preferably a thread. The thread is preferably a self-sealing thread. Alternatively, a sealing ring may be provided between the thread and the complementary receiver 4 of the antifreeze inlet 5. The connecting structure 3 is not however restricted to a thread, and may be any other suitable structure such as for example a bayonet connection or a snap closure. Also, a simple press fit or transition fit between the connecting structure 3 and the complementary receiver 4 of the antifreeze inlet 5 is possible.

The connecting structure 3 has a blocking device 17 which is configured to prevent release of the connecting structure 3 from the complementary receiver 4 of the antifreeze inlet 5 if a predefined minimum quantity of antifreeze agent is present in the container 2. This avoids the user accidentally releasing a filled antifreeze cartridge 1 and the antifreeze agent undesirably escaping. This blocking device may be a mechanical interlock which is actuated by an electric motor (not shown) and a control device 18 to be described below. If the control device 18 detects that the antifreeze cartridge 1 is empty or contains less than the predefined minimum quantity of antifreeze agent, it may send a control signal to the electric motor to release the mechanical interlock of the blocking device 17. Also, purely mechanical solutions are conceivable; the blocking device 17 may for example have a float and a locking element. If the predefined minimum quantity or more of the antifreeze agent is contained in the antifreeze cartridge 1, the float may hold the locking element at a locking position in which release of the connecting structure 3 from the complementary receiver 4 of the antifreeze inlet 5 is prevented.

The antifreeze supply device 8 has a screenwash tank 9 which is connected via a transport line 10 to the hollow perforation element 6 in order to supply the antifreeze agent from the antifreeze inlet 5 to the screenwash tank 9. The screenwash tank 9 contains a water-based dilutant which is used for a screenwash system of the motor vehicle. The dilutant may be for example distilled water. The antifreeze supply device 8 comprises a pump 19 and the control device 18, which are configured to supply the antifreeze from the container 2 to the screenwash tank 9 in metered fashion. Also, the quantity of antifreeze agent to be supplied to the screenwash tank 9 may be metered depending on certain parameters, such as e.g. an antifreeze concentration in the washing water, an external temperature or a fill level of the washing water in the screenwash tank 9. The lower the external temperature, or the lower the antifreeze concentration, or the higher the fill level of the washing water in the screenwash tank 9, the more antifreeze agent should be added. The control device 18 may also be connected to a vehicle information system to inform the user whether or how much antifreeze agent is contained in the antifreeze cartridge 1. The control device 18 may inform the vehicle information system that the empty antifreeze cartridge 1 should be exchanged. The pump 19 and the control device 18 are provided in or on the antifreeze inlet 5. It is also possible to provide the pump and control device in or on the screenwash tank 9.

The antifreeze agent mixed with the dilutant forms a screenwash agent which is supplied to a windscreen of the motor vehicle via lines and nozzles not shown.

The antifreeze supply device 8 furthermore comprises an overflow line 11 through which the antifreeze agent can be discharged from the container 2 to the environment. Thus the antifreeze agent can be discharged manually and rapidly, for example if the user wishes to release the antifreeze cartridge 1 which still contains a residual quantity of antifreeze agent.

Figure 2:
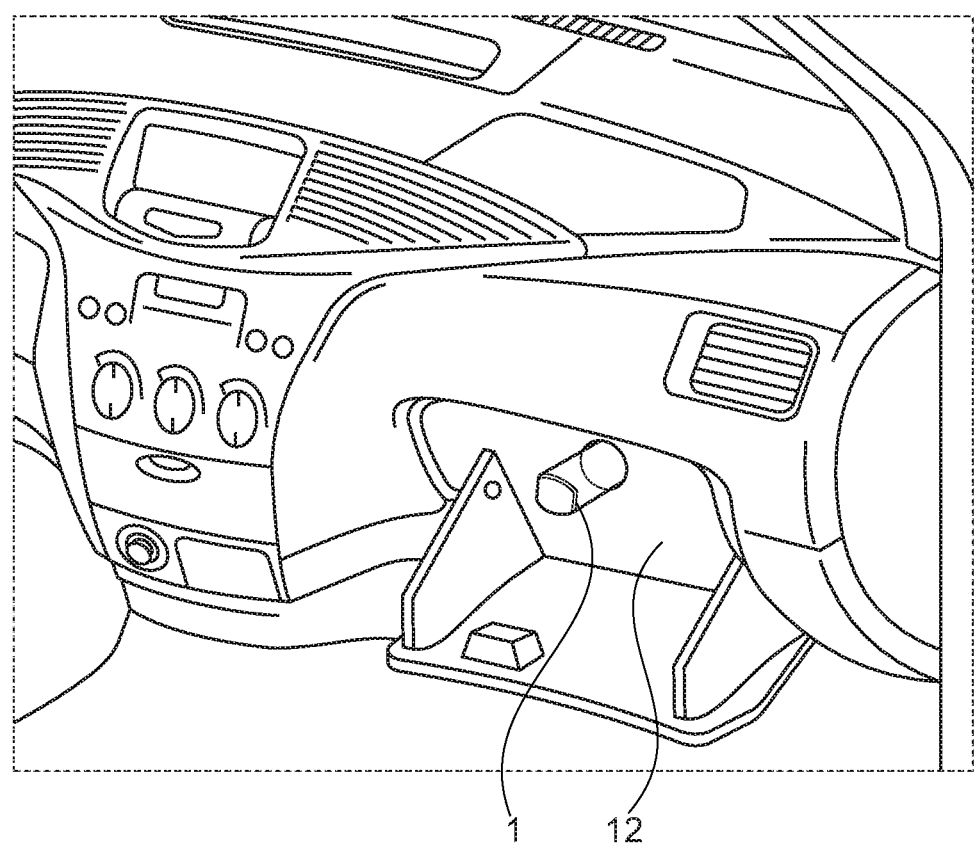
FIG. 2 is a view of the interior of the vehicle showing the glovebox in the exemplary embodiment.

FIG. 2 shows a view of the vehicle interior. The antifreeze cartridge 1 is arranged in a glove box 12 of the motor vehicle. Thus the antifreeze cartridge is easily accessible. There is no need to open the hood of the motor vehicle to exchange the antifreeze cartridge 1.

Figure 3:
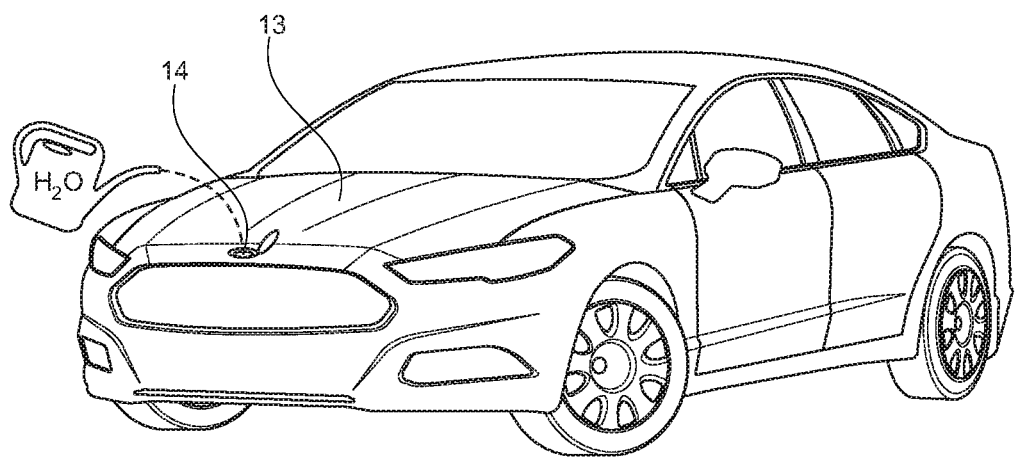
FIG. 3 is a view of a motor vehicle according to an alternative exemplary embodiment of the present invention.
Figure 4:
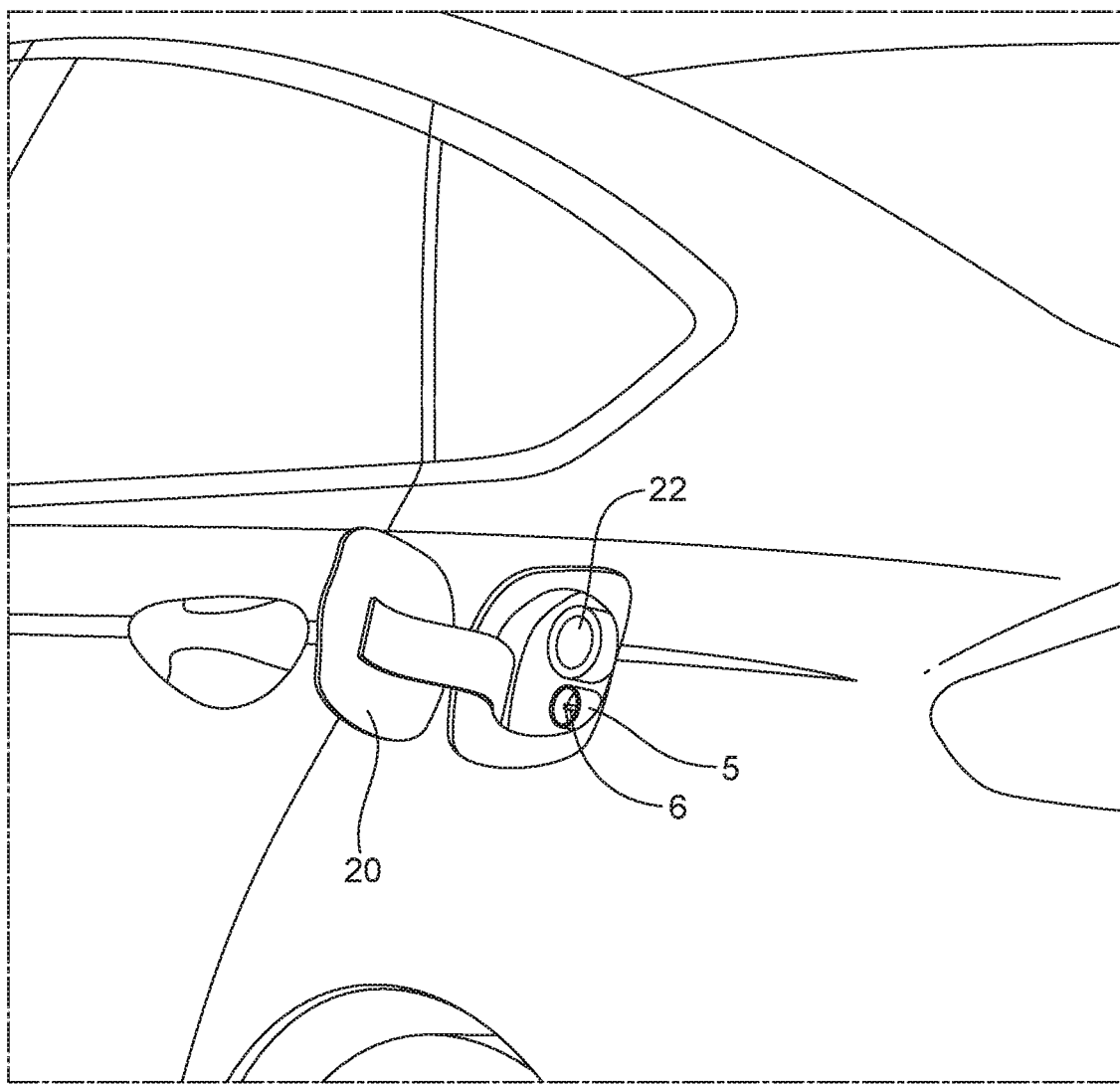
FIG. 4 illustrates an embodiment wherein the antifreeze inlet is concealed behind the same cover that conceals the fuel filler neck.

FIG. 3 shows an alternative solution to the problem of the present invention. Here, a motor vehicle 24 has an antifreeze inlet 5 which is accessible from the outside of the engine bay of a motor vehicle without opening the hood 13 of the motor vehicle. In this case too, the hood 13 of the motor vehicle need not be opened to top up the antifreeze agent. More precisely, the antifreeze inlet 5 is concealed below a brand logo 14 of the motor vehicle. The brand logo 14 is pivoted to the vehicle bodywork by means of a hinge and can easily be folded open to obtain access to the antifreeze inlet 5. Alternatively, as illustrated in FIG. 4, the antifreeze inlet 5 may be concealed below a cover 20 of a fuel filler neck 22 of the motor vehicle. In both cases, an economical solution is achieved since no separate cover need be provided for the antifreeze inlet.

The motor vehicle may also be equipped with the frost-protection system 7 described above so that in addition the advantages described therefor are achieved.

What is claimed:

1. An antifreeze cartridge, comprising:
a container containing an antifreeze agent which is intended for a screenwash system of a motor vehicle; characterized by a sealing film on the container and a connecting structure configured for connection to a complementary receiver of an antifreeze inlet of the motor vehicle, wherein the container has a handling portion configured to allow manual connection of the connecting structure to the complementary receiver of the antifreeze inlet and wherein the sealing film is configured to be perforated by a hollow perforation element of the antifreeze inlet whereby the antifreeze agent contained in the container can be supplied to a frost-protection system of the motor vehicle through the hollow perforation element and wherein the connecting structure has a blocking device configured to prevent release of the connecting structure from the complementary receiver of the antifreeze inlet if a predefined minimum quantity of the antifreeze agent is present in the container.

2. The antifreeze cartridge as claimed in claim 1, wherein the connecting structure is configured whereby upon connection to the complementary receiver of the antifreeze inlet, the hollow perforation element automatically perforates the sealing film.

3. The antifreeze cartridge as claimed in claim 2, wherein the connecting structure is a thread, a bayonet connection or a snap closure.

4. The antifreeze cartridge as claimed in claim 3, wherein the connecting structure has a blocking device configured to prevent release of the connecting structure from the complementary receiver of the antifreeze inlet if a predefined minimum quantity of the antifreeze agent is present in the container.

5. The frost-protection system comprising the antifreeze cartridge as set forth in claim 1, and an antifreeze supply device of the motor vehicle having the antifreeze inlet, wherein the antifreeze supply device has a screenwash tank connected via a transport line to the hollow perforation element in order to supply the antifreeze agent from the antifreeze inlet to the screenwash tank, and wherein the antifreeze supply device has a pump and a control device which are configured to supply the antifreeze agent from the container to the screenwash tank in a metered fashion.

6. The frost-protection system as claimed in claim 5, wherein the antifreeze supply device has an overflow line through which the antifreeze agent can be discharged from the container to the environment.

7. The frost-protection system as claimed in claim 5, wherein the antifreeze cartridge is arranged in a glovebox of the motor vehicle.

* * * * *